A. W. ZERATSKY.
MILKING MACHINE.
APPLICATION FILED AUG. 2, 1915.

1,184,293.

Patented May 23, 1916.
2 SHEETS—SHEET 1.

A. W. ZERATSKY.
MILKING MACHINE.
APPLICATION FILED AUG. 2, 1915.
1,184,293.
Patented May 23, 1916.
2 SHEETS—SHEET 2.
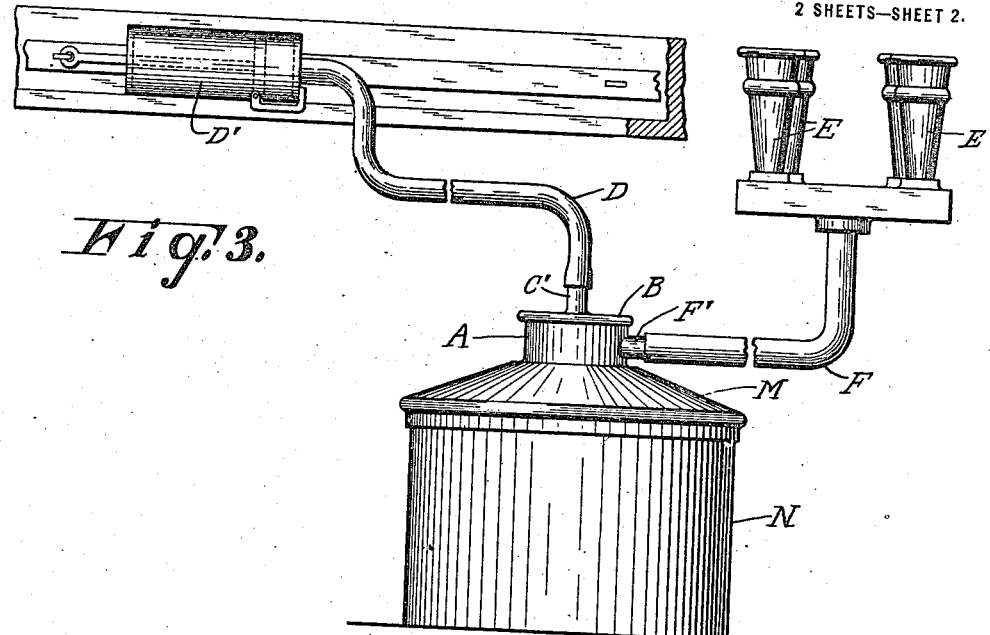
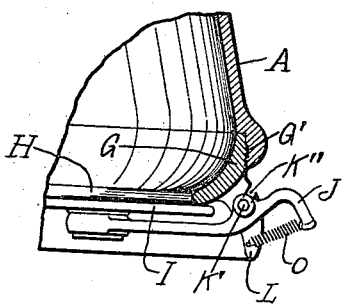
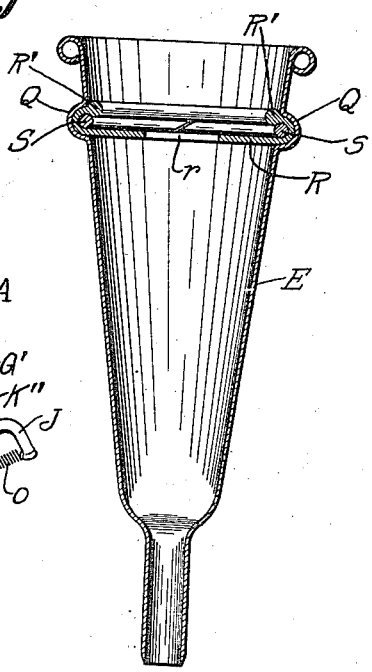

UNITED STATES PATENT OFFICE.

AUGUST W. ZERATSKY, OF LA CROSSE, WISCONSIN.

MILKING-MACHINE.

1,184,293.  Specification of Letters Patent.  Patented May 23, 1916.

Application filed August 2, 1915. Serial No. 43,099.

*To all whom it may concern:*

Be it known that I, AUGUST W. ZERATSKY, a citizen of the United States residing at La Crosse, county of La Crosse, and State of Wisconsin, have invented new and useful Improvements in Milking-Machines, of which the following is a specification.

My invention relates to improvements in milking machines.

In the machines of ordinary type, the milk is drawn from the teat cups into a vacuum chamber which has a suction duct leading to a suitable pump or other means for withdrawing air intermittingly from said vacuum chamber. In the intervals following the suction periods, the milk is delivered from the vacuum chamber into a receiver, but owing to the fact that the stream of milk enters the vacuum chamber with considerable force, a difficulty has heretofore been experienced in preventing it from being drawn into the suction duct with the air which is being withdrawn from the chamber. In the modern stable there is a suction main and branch ducts for each stall, more or less permanently connected and to which the vacuum chamber is temporarily connected by a rubber hose, which forms an extension of the duct. These ducts, particularly the permanent parts, are difficult to clean and if milk is permitted to enter them, unsanitary conditions are set up, and milk entering such ducts becomes infected and tends to drip back into the vacuum chamber, thereby infecting the milk in the receiver.

The object of my invention is to provide a sanitary milking machine having a vacuum chamber provided with an air outlet connected with a suction duct from which the milk will be entirely excluded.

More specifically stated, the object of my invention is to provide a form of vacuum chamber in which the agitation of the milk, due to its forcible entry into the chamber and the influence of the currents of air which are being withdrawn from the chamber, will be so controlled that the momentum of the milk will be utilized to direct it away from the air outlet and toward the milk outlet, the agitation of the milk being also effectively reduced from that existing in the ordinary vacuum chambers.

A further object of my invention is to provide a form of construction in which all parts may be easily separated and thoroughly cleaned.

Figure 1:
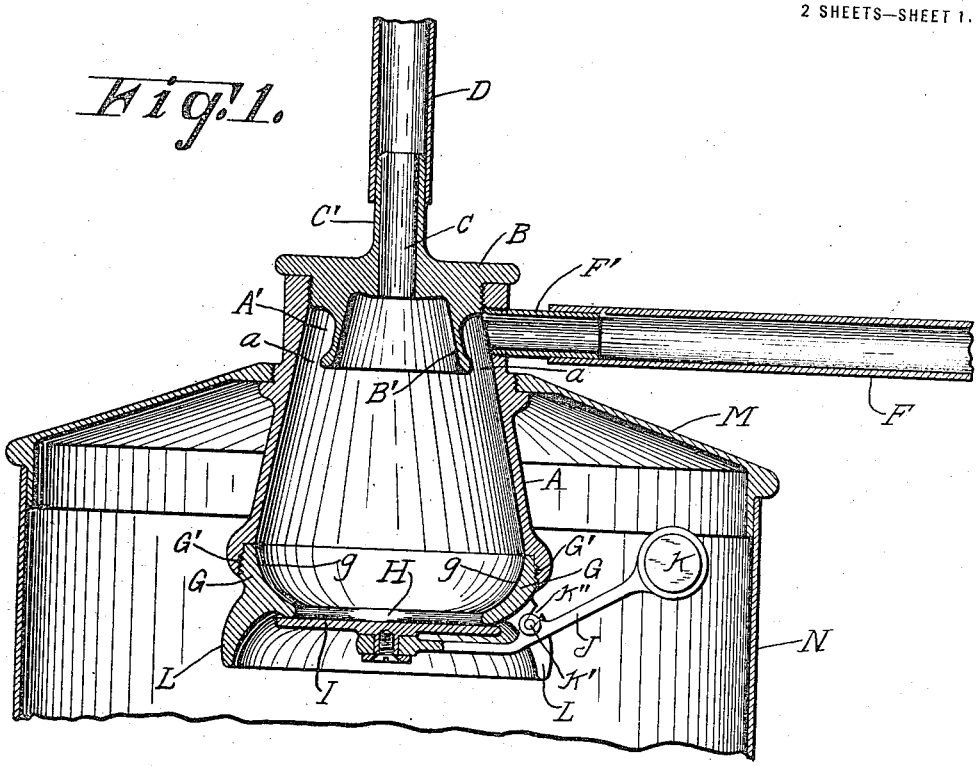
Figure 2:
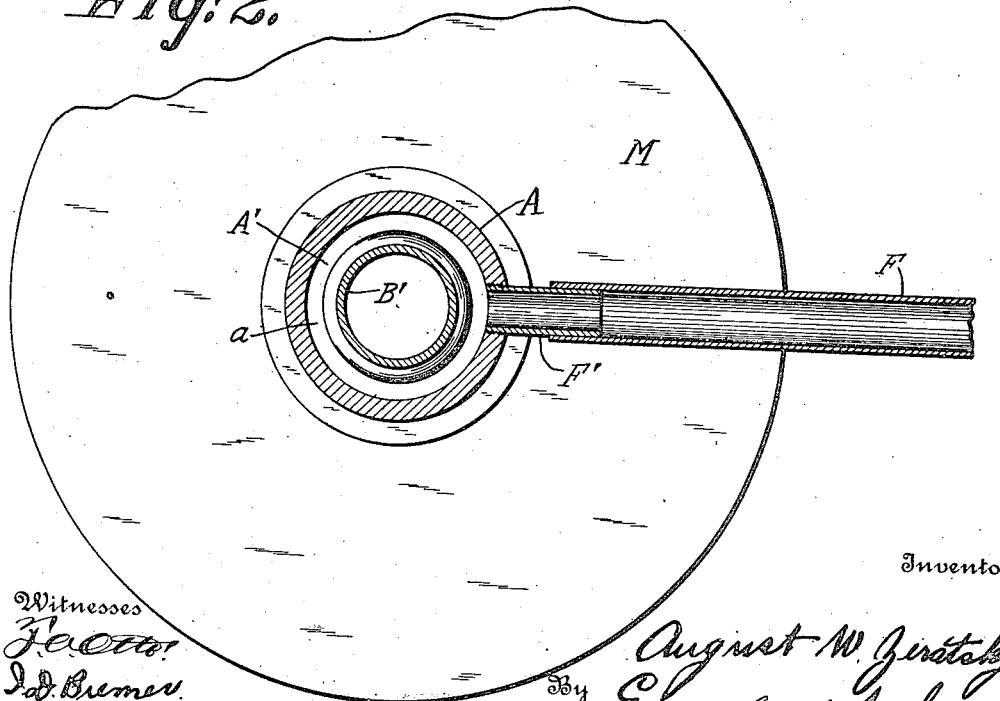

In the drawings Figure 1 is a vertical sectional view of a vacuum chamber embodying my invention, showing also fragments of the suction duct, the milk tube and the receiver, said view being taken on a plane cutting the axes of the suction duct and milk duct. Fig. 2 is a horizontal sectional view, drawn to a plane cutting the axis of the milk tube or duct. Fig. 3 is a general view of the complete machine. Fig. 4 is a detail sectional view, showing a modified form of outlet valve mechanism. Fig. 5 is a detail sectional view of one of the teat cups.

Like parts are identified by the same reference characters throughout the several views.

A is a vacuum chamber provided with a cap B, having an air outlet port C therein which is preferably centrally located. The cap is provided with a nipple C', and a suction tube or duct D connected with this nipple leads to a suitable pump D' having a reciprocating piston therein, the movement of which in one direction will withdraw air from the vacuum chamber. During the return stroke of the piston, the air will be returned to the chamber and the vacuum relieved. It will of course be understood that in an ordinary stable the suction duct D will include a set of pipes and branches (not shown), such as are ordinarily employed in connection with modern milking apparatus.

The teat cups E are connected with the vacuum chamber by a flexible duct F and a suitable nipple F' which constitutes an inlet port for the vacuum chamber and which is located a little below the cap B. The cap B is provided with a downwardly projecting bell shaped extension B' which forms a circular partition within the vacuum chamber A, said partition B' extending below the inlet port F with its lower margin bell shaped and curving outwardly toward the side walls of the chamber A, thereby forming an annular receiving cavity A' from which the milk is delivered downwardly through the contracted annular cavity outlet $a$ and along the surface of the side wall of chamber A.

It will be observed that the walls of the chamber A are conically tapered, said chamber being enlarged downwardly and the walls of the cavity A are so formed that the milk is directed downwardly and outwardly and substantially parallel with the interior surface of the wall of chamber A. The bell shaped cap extension B' is slightly thickened at its lower end, and since its outer surface iverges slightly toward the wall of the chamber A, there will be a slight tendency to a delivery of the milk against the interior surface of the chamber wall, but this outward delivery of the milk toward the chamber wall is so slight that the milk will not splash or rebound from the wall, the delivery being in fact nearly parallel thereto.

The chamber A is provided with a detachable base member G which has threaded engagement with the side walls at G' and also has a concavely rounded, downwardly and inwardly tapering inner surface g, which forms a continuation of the inner surface of the side walls of chamber A, whereby the milk is directed toward a central aperture H in the base member which constitutes an outlet port.

The outlet port is normally closed by a valve I which seats upon the exterior surface of the base member against the pressure of the milk within the chamber. This valve is provided with an operating lever J having a counterweight K which tends normally to hold the valve to its seat, but which substantially balances the weight of the valve and yields under slight downward pressure thereon. The lever J is provided with laterally projecting studs K' loosely socketed in notches K'' formed in an annular guard flange L which extends downwardly from the base G with its lower margin in a plane below the valve I and its operating lever. The lever J extends through a suitable opening or slot formed in the guard flange L.

In operation, the teat cups being in position, and suction being applied through the vacuum duct D, milk will be drawn forcibly through the tube F into the receiving cavity A' of the vacuum chamber. The milk will strike forcibly against the outer surface of the bell B' and will be directed and deflected along the walls of the cavity A' toward the opposite side of the chamber. The streams of milk flowing in opposite directions in the cavity A' will of course meet at the side opposite the milk inlet and the force of each will largely neutralize the force of the other. The force of the streams will be so quickly checked, that the cavity A' will immediately become substantially filled with milk, whereupon the relatively large outlet afforded by the annular opening at a will permit the milk to discharge downwardly. The force of the discharge through the annular outlet of the receiving cavity A' will be sufficient to cause the milk to follow the contour of the side walls of the chamber A, but will be insufficient to cause splashing against these walls. It will also be observed that when the milk strikes the base G, it will be received upon the surface g which will gradually deflect it inwardly in the direction of the outlet port H. To accomplish these results, it is necessary that the receiving cavity A' and its outlet a shall have a capacity greater than that of the inlet port F and also that provision be made in the receiving cavity for checking the velocity of the milk stream discharged through the port F, so that cavity A' will fill and perform the function of a motion checking receiver having a sufficiently large outlet to prevent the development of pressure sufficient to cause splashing against the walls of the chamber A below the receiver, while permitting the development of sufficient pressure to direct the milk delivery downwardly along divergent lines toward the base of the cone. This direction of the milk delivery along the interior surface of the cone toward the base thereof, is extremely important, since the withdrawal of the air through the suction duct D tends to form a cone in the opposite direction. That is to say, it tends to draw the milk with the withdrawing air inwardly toward the center of the chamber A and upwardly toward the air outlet. The force with which the milk is discharged downwardly and outwardly from the receiving chamber A',—while insufficient, as above stated, to cause splashing,—is nevertheless sufficient to counteract the indrawing tendency developed by the suction.

When the vacuum in chamber A is relieved during the return stroke of the pump piston, the weight of the milk exerted upon valve I and added to the weight of the valve, causes said valve to swing to open position, counterweight K being lifted. During this movement the counterweight moves toward the center line of the pivot K' a sufficient distance to reduce the leverage and allow the valve I to remain open until the contents of chamber A have been entirely discharged, after which the weight overcomes the weight of the valve I and causes the latter to swing to its seat.

It will be observed that when the cup B is removed, access is afforded to the interior of the chamber A and also to the exterior surface of the flange B'. Also that the valve I with the lever J may not only be removed by slipping the studs K' out of engagement in the notches K'', but that the base member G may also be unscrewed and removed from the side walls of the chamber A. All of the parts may therefore be readily separated at points which permit them to be thoroughly cleansed.

M is a supporting cap or cover for a milk receptacle N into which the milk is discharged from chamber A. The cap N is preferably in screw threaded engagement with the chamber A and supports the chamber when the latter is in use. The projecting flange L supports the chamber when it is removed from the receptacle N and placed upon a table or shelf.

Referring to Fig. 4, it will be observed that the construction is the same as that disclosed in the other views, except that I have substituted for the counterweight K a coiled spring O which performs similar functions to those performed by the counterweight. The spring is somewhat more sensitive in its action, but the counterweight is preferred for the reason that it is more easily cleaned.

Referring now to the teat cups E, it will be noticed that each of these cups is provided with an outwardly embossed annular rib Q, whereby a groove is formed in the interior surface of the cup, said groove having rounded surfaces. A rubber diaphragm R is inserted in the cup and engaged in this groove by means of a split ring S. The engaged margin of the diaphragm may, if desired, be provided with an enlargement R', but this is not essential. The diaphragm is provided with a central aperture $r$ through which the teat is passed. By locating the diaphragm a substantial distance below the top of the cup, I provide for engaging the teat without applying pressure to the upper end thereof at a point where such pressure would interfere with the flow of milk from the udder. By employing a split ring S to hold the diaphragm in place in a broad open groove having rounded surfaces, it is obvious that the diaphragm and split ring may be removed at pleasure for the purpose of cleaning the cup and the cups can therefore be kept in a perfectly sanitary condition.

I claim—

1. In a milking machine, a vacuum chamber having conically tapered side walls converging toward the upper end of the chamber and means for delivering milk into the upper portion of said chamber and downwardly along the divergent walls thereof, whereby its force diminishes in the progressively enlarging area.

2. In a milking machine, a vacuum chamber having conically tapered side walls converging toward the upper end of the chamber, and provided with a milk inlet near the upper end of said chamber, a bell shaped flange depending from the upper portion of said chamber with its lower margin extending below the milk inlet and forming an annular receiving chamber between said flange and that portion of the outer wall of the chamber which is provided with the inlet, said chamber having an air outlet communicating with the central space within said bell shaped flange.

3. In a milking machine, a vacuum chamber provided with an air outlet in its upper portion and a valved milk outlet in its lower portion, in combination with an annular flange surrounding the air outlet, said chamber having a milk receiving cavity exterior to said flange, the walls of which are provided with a milk inlet, and also provided with an outlet of larger capacity leading into the lower portion of the chamber.

4. In a milking machine, a vacuum chamber provided with an air outlet in its upper portion and a valved milk outlet in its lower portion, in combination with an annular flange surrounding the air outlet, said chamber having a milk receiving cavity exterior to said flange, the walls of which are provided with a milk inlet, and also provided with an outlet of larger capacity leading into the lower portion of the chamber, said milk receiving cavity and its outlet being annular in form and arranged to discharge milk from the cavity in a conical sheet.

5. In a milking machine, a vacuum chamber provided with an air outlet in its upper portion, in combination with an annular flange surrounding the air outlet, said chamber having a milk receiving cavity exterior to said flange, the walls of which are provided with a milk inlet, and also provided with an outlet of larger capacity leading into the lower portion of the chamber, said milk receiving cavity and its outlet being annular in form and arranged to discharge milk from the cavity in a conical sheet, the walls of the vacuum chamber being also inclined downwardly and outwardly.

6. In a milking machine, a vacuum chamber provided with a removable top cap having an air outlet port therein and also having a lateral milk inlet port adjacent to its top, and a valved outlet port in its bottom portion, in combination with a depending flange surrounding the air outlet port and connected with the cap, said flange being outwardly flared in its lower portion, and adapted to form an annular milk receiving open-bottomed cavity between it and the outer wall of said chamber, adapted to direct the delivered milk downwardly and outwardly in a substantially conical sheet, said lateral milk inlet port being adapted to direct the entering milk against the walls of the bell and circularly around the same, whereby its velocity is checked.

7. In a milking machine, a vacuum chamber, comprising the combination with conically tapered side walls provided with a milk inlet port, of a detachable ported top cap and a detachable ported base member, and a valve controlling the base member port.

8. In a milking machine, a vacuum chamber, comprising the combination with conically tapered side walls provided with a milk inlet port, of a detachable ported top cap, a detachable ported base member, and a valve controlling the base member port, said base member having a downwardly and inwardly converging inner surface.

9. In a milking machine, a vacuum chamber, comprising the combination with conically tapered side walls provided with a milk inlet port, of a detachable ported top cap, a detachable ported base member, a valve controlling the base member port, and means for retarding a stream of milk entering said inlet port and deflecting the same downwardly and outwardly along said tapered side walls in the direction of the base member.

10. In a milking machine, a vacuum chamber provided with an outlet port in its bottom, a valve normally closing said port, a valve lever connected with the valve, and two outwardly projecting circular flanges constituting annular supporting members connected with said chamber, one of said members being adapted to support the vacuum chamber with its valved outlet depending in a milk receiver, and the other being arranged to encircle the valve and direct the milk downwardly and also adapted to support the vacuum chamber from a table in an upright position and with the valve out of contact therewith, said last mentioned flange being slotted and adapted to receive and support the valve lever.

11. In a milking machine, a vacuum chamber provided with an outlet port in its bottom, a valve normally closing said port, and a depending flange surrounding the port and valve, said valve having an operating lever provided with fulcrum members and said flange being slotted to permit the lever to pass through it and having open notches to loosely receive and support said fulcrum members, whereby the valve lever may be lifted to permit its removal, with the valve.

12. In a milking machine, a vacuum chamber provided with an outlet port in its bottom, a valve normally closing said port, and a depending flange surrounding the port and valve, said valve having an operating lever provided with fulcrum members and said flange being slotted to permit the lever to pass through it and having open notches to loosely receive and support said fulcrum members, whereby the valve lever may be lifted to permit its removal with the valve, the outer end of said lever being counterweighted, substantially as described.

13. In a milking machine, a teat cup having an annular groove in its upper portion located at a substantial distance below the upper end of the cup, an elastic diaphragm having a central aperture to receive the teat, and a split ring clamping the outer margins of said diaphragm in said groove, whereby the diaphragm, and ring may be removed from and replaced in the cup at pleasure.

In testimony whereof I affix my signature in the presence of two witnesses.

AUGUST W. ZERATSKY.

Witnesses:
  CHAS. B. JANSKY,
  L. J. PRUCHA.

Copies of this patent may be obtained for five cents each, by addressing the "Commissioner of Patents, Washington, D. C."